(12) United States Patent
Bernard

(10) Patent No.: US 6,764,083 B2
(45) Date of Patent: Jul. 20, 2004

(54) PROCESS OF CONVERTING A VEHICLE INTO A UTILITY STRUCTURE

(76) Inventor: David J. Bernard, 599 Woodfine Way, Casselberry, FL (US) 32707

( * ) Notice: Subject to any disclaimer, the term of this patent is extended or adjusted under 35 U.S.C. 154(b) by 0 days.

(21) Appl. No.: 10/132,507

(22) Filed: Apr. 26, 2002

(65) Prior Publication Data

US 2003/0201633 A1 Oct. 30, 2003

(51) Int. Cl.⁷ .................................. B62B 1/04
(52) U.S. Cl. ................... 280/30; 280/762; 248/352; 296/24.3
(58) Field of Search ................... 280/762, 767, 280/30, 6.153, 6.154, 6.155, 763.1; 248/352, 188.1, 188.2, 354.1; 482/61; D34/31; 296/24.3

(56) References Cited

U.S. PATENT DOCUMENTS

| | | | |
|---|---|---|---|
| 2,888,296 A | * | 5/1959 | Huggins ................... 296/24.3 |
| 3,442,549 A | | 5/1969 | Granger |
| 4,223,939 A | | 9/1980 | Beggs |
| 4,261,613 A | | 4/1981 | Alford |
| 4,573,225 A | | 3/1986 | Wolf |
| 5,018,778 A | | 5/1991 | Goble |
| 5,340,188 A | | 8/1994 | Goble |

* cited by examiner

*Primary Examiner*—Bryan Fischmann
(74) *Attorney, Agent, or Firm*—William M. Hobby, III

(57) ABSTRACT

A method of converting a vehicle into a utility structure includes the steps of selecting a used vehicle having a vehicle body having seats therein and at least one door and a plurality of wheels. A support stand is selected for attachment to at least one of the wheel studs of the vehicle for supporting the vehicle on a surface and replacing each of the plurality of wheels with a support stand. The process includes attaching the support stands to the vehicle wheel studs and removing one or more seats from the vehicle. The process may also include the step of removing the engine and fuel tank from the vehicle and placing the vehicle wheels in storage in the vehicle body for later use in moving the utility structure by replacing the support stands with the wheels. The support stand has an elongated post having openings therein for fitting over the axle hub and onto the lugs and a flat base for supporting the post on a surface.

9 Claims, 4 Drawing Sheets

PROCESS OF CONVERTING A VEHICLE INTO A UTILITY STRUCTURE

BACKGROUND OF THE INVENTION

The present invention relates to a method of converting a vehicle into a utility structure and especially to a process which replaces the wheels of the vehicle with support stands and removes the vehicle seats to form a utility structure.

In the past, it has been common to junk used vehicles, such as automobiles, vans and the like, which have run their useful life. Typically, a vehicle is cannibalized of parts for use in the repair of other vehicles and the vehicle body crushed for recycling the metal. Tires, however, are removed from the vehicles for disposal, such as in a recycling program. Most vehicles have useful components, such as the engine, fuel tank, radiator, and operative components which are removed from the vehicle body leaving a body which is water and weathertight and having doors with door seals for sealing the interior of the vehicle body against the weather. The door and trunk lid of the vehicle body also includes locks for locking the body and can be modified for providing power to the interior lights and for other components of the vehicle as desired. The present invention is directed towards a process for converting used vehicles which have spent most of their useful life and cannibalize those components, such as the engines and other operative components, but not thereafter crushing the vehicle, as is the current practice but rather converting the vehicle to a useful weathertight structure complete with locking doors. The operative components, including the fuel tank, engine, transmission, and interior seats as well as air conditioning components, alternator, radiator, and the like can then be recycled as used automotive parts and the vehicle then made into a utility structure.

In the past, it has also been suggested to convert various types of vehicles into expanded camping structures, such as may be seen in the U.S. Pat. No. 3,442,549 to Granger which removes the trunk of an automobile for mounting the camper body into the trunk and over the roof of a sedan automobile. In the Beggs U.S. Pat. No. 4,223,939 an attachment for converting a vehicle, such as a compact vehicle, into an expandable vehicle having an enlarged expandable usable volume. In the Alford U.S. Pat. No. 4,261,613 a van having a forward cab section and a rear passenger cargo section is convertible to a tall wall pickup or camper shell configuration by an overhead door or roof panel which is removable from a position overlying and covering an overhead roof opening to an upstanding vertical position. In the U.S. Pat. No. 4,573,225 to Wolf a convertible seat bed and storage unit has a pair of frame elements which support a plurality of panels in a seat configuration and which convert to support the same panels in a bed configuration and is suited for mounting in the cargo space of a van-type vehicle.

The present invention is for a process for converting a used vehicle which might otherwise be ready for a junk yard and which allows for the removal and use of the main operative components for recycling while converting the body portion into a utility structure.

SUMMARY OF THE INVENTION

A method of converting a vehicle into a utility structure includes the steps of selecting a used vehicle having a vehicle body having seats therein and at least one door and a plurality of wheels. In one variation of the invention, a support stand is selected for attachment to at least one of the wheel studs of the vehicle for supporting the vehicle on a surface and replacing each of the plurality of wheels with a support stand. The process includes attaching the support stands to the vehicle wheel studs and removing one or more seats from the vehicle. The process may also include the steps of removing the engine and fuel tank from the vehicle and placing the vehicle wheels in storage in the vehicle body for later use in moving the utility structure by replacing the support stands with the wheels. The support stand has an elongated post having openings therein for fitting over the axle hub and onto the wheel studs and a flat base for supporting the post on a surface.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
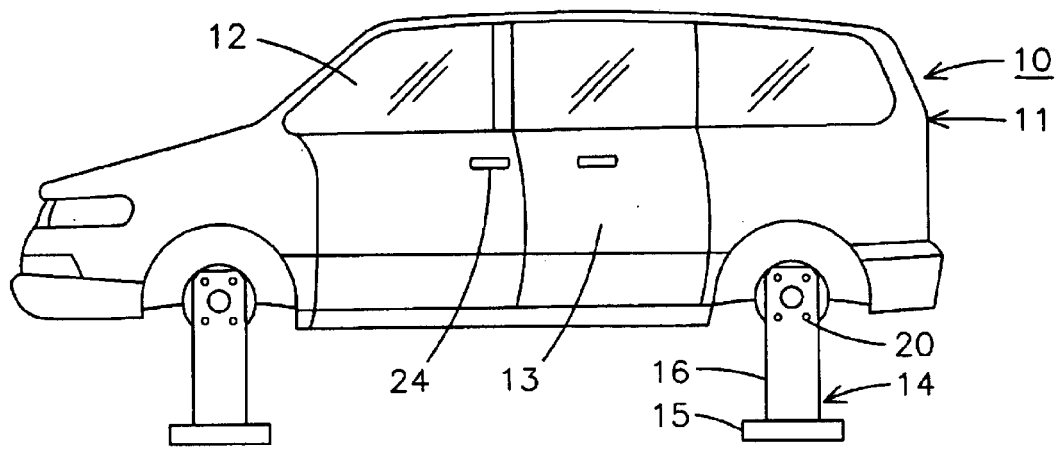
FIG. 1 is a side sectional view of a vehicle converted into a utility structure.
Figure 2:
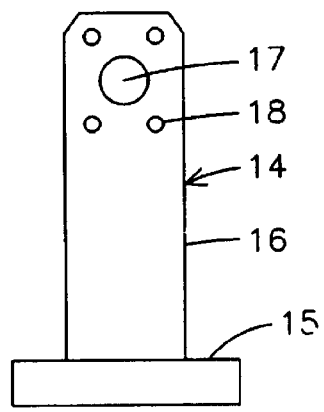
FIG. 2 is an elevational view of a support bracket for supporting the structure of FIG. 1.
Figure 3:
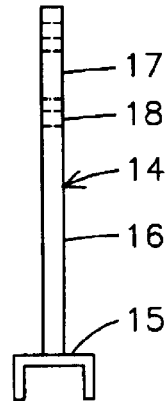
FIG. 3 is a side sectional view of the support bracket of FIG. 2.
Figure 4:
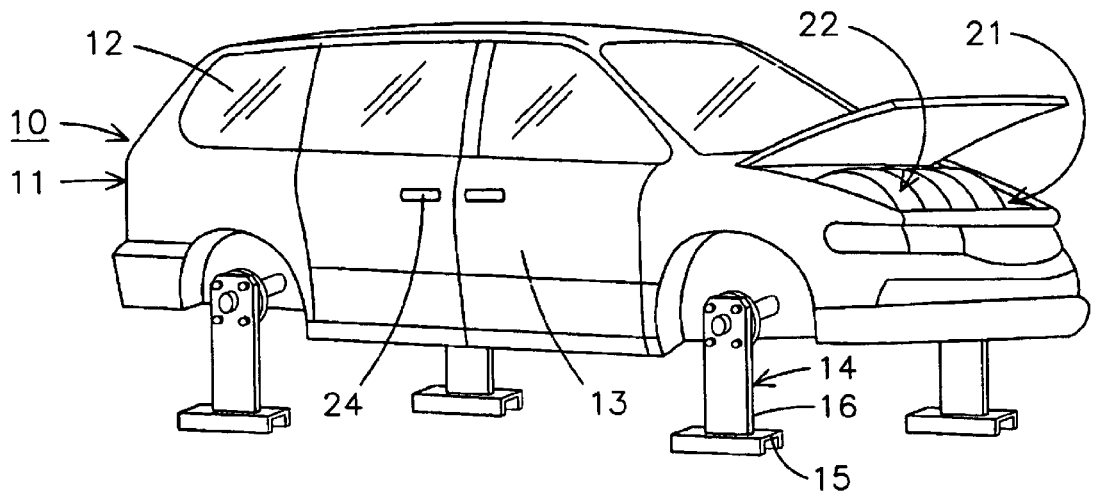
FIG. 4 is a perspective view of the utility structure of FIG. 1 having the hood removed showing the storage of the removed wheels in place of the removed engine.

Referring to FIGS. 1–4, a vehicle 10, such as an automobile, is shown converted into a utility structure in accordance with the present invention. The utility structure 10 has a vehicle body 11 having windows 12, doors 13, and having the vehicles wheels and tires removed and replaced with support stands 14. The support stands have a base 15 having an upright post 16 with an opening 17 in the post 16 for an axle hub to fit through and a plurality of openings 18 positioned to fit onto wheel studs 20 in place of the wheels which would normally be mounted to the wheel studs. As seen in FIG. 4, the engine compartment 21 of the vehicle has the engine removed along with all of the operative components, such as the air conditioning, compressor, radiator, generator, or alternator and any components that would be useful in the repair of other vehicles. The tires and wheels 22 have been placed in the engine compartment for storage. If the structure 10 is to be moved, the wheels 22 can be removed and can replace the support stands 14 on the vehicle so that the vehicle becomes a wheeled structure which can be towed to a different location as desired. The vehicle doors 13 have locks 24 which are maintained with the door handles and other components of the doors so that the doors can be opened and closed while forming a weathertight seal within the vehicle body 11 which can be locked for security purposes. In addition, a small solar battery or other power supply can be incorporated into the structure 10 for operating the lights, electric windows and locks and other electrical components as desired to replace the vehicle battery. Solar batteries can also be used to operate a security system in the vehicle. It would of course be clear that any type of vehicle desired can be utilized, including vans and station wagons, which have spent most or all of their useful life on the road being converted to larger utility structures.

Figure 5:
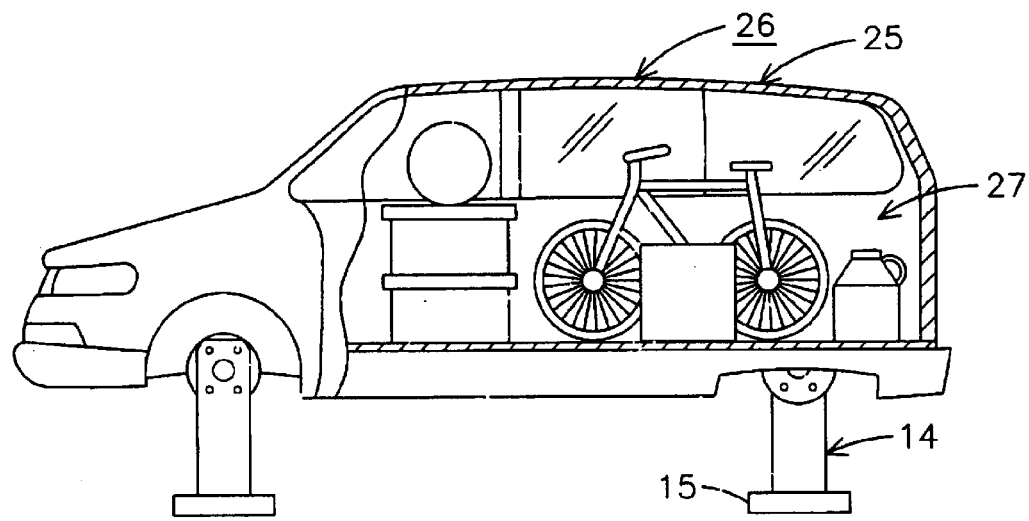
FIG. 5 is a sectional view of a utility structure in accordance with the present invention.

Turning to FIG. 5, a van type vehicle 25 has been converted to the utility storage structure 26 and may have rear or side doors and has been converted using the support stands 14 sitting on the bases 15 which have been attached to the wheel studs to replace the wheels. The vehicle has had the interior 27 having all of the interior seats and components removed to make more room for a storage utility shed made from the body 25 of the vehicle.

Figure 6:
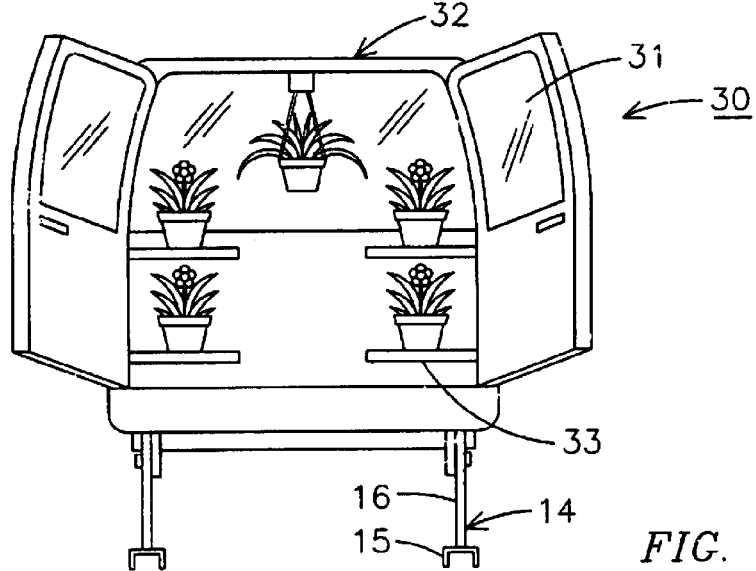
FIG. 6 is an end view of a different type of vehicle converted into a greenhouse structure.

FIG. 6 shows a utility greenhouse structure 30 converted from a station wagon or a van having rear doors 31 on the body 32 and supported on the support stands 14. The structure and all the interior seats have been removed and replaced with shelving 33 for supporting plants therein. The glass portions of the doors, windows and roof are maintained for providing sunlight to the interior of the structure and special lamps can be formed for the inside as desired.

Figure 7:
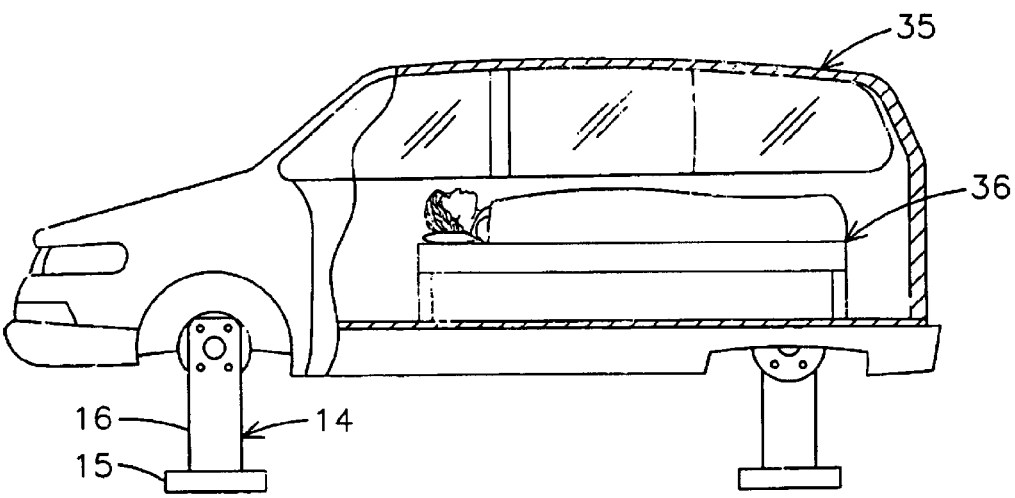
FIG. 7 is a partial section of a utility structure in accordance with the present invention having cots formed therein.

In FIG. 7, a utility structure 35 has had the interior seats removed and replaced with cots 36 which can be used as a sleeping structure on a temporary basis and has the vehicle supported on the stands 14.

Figure 8:
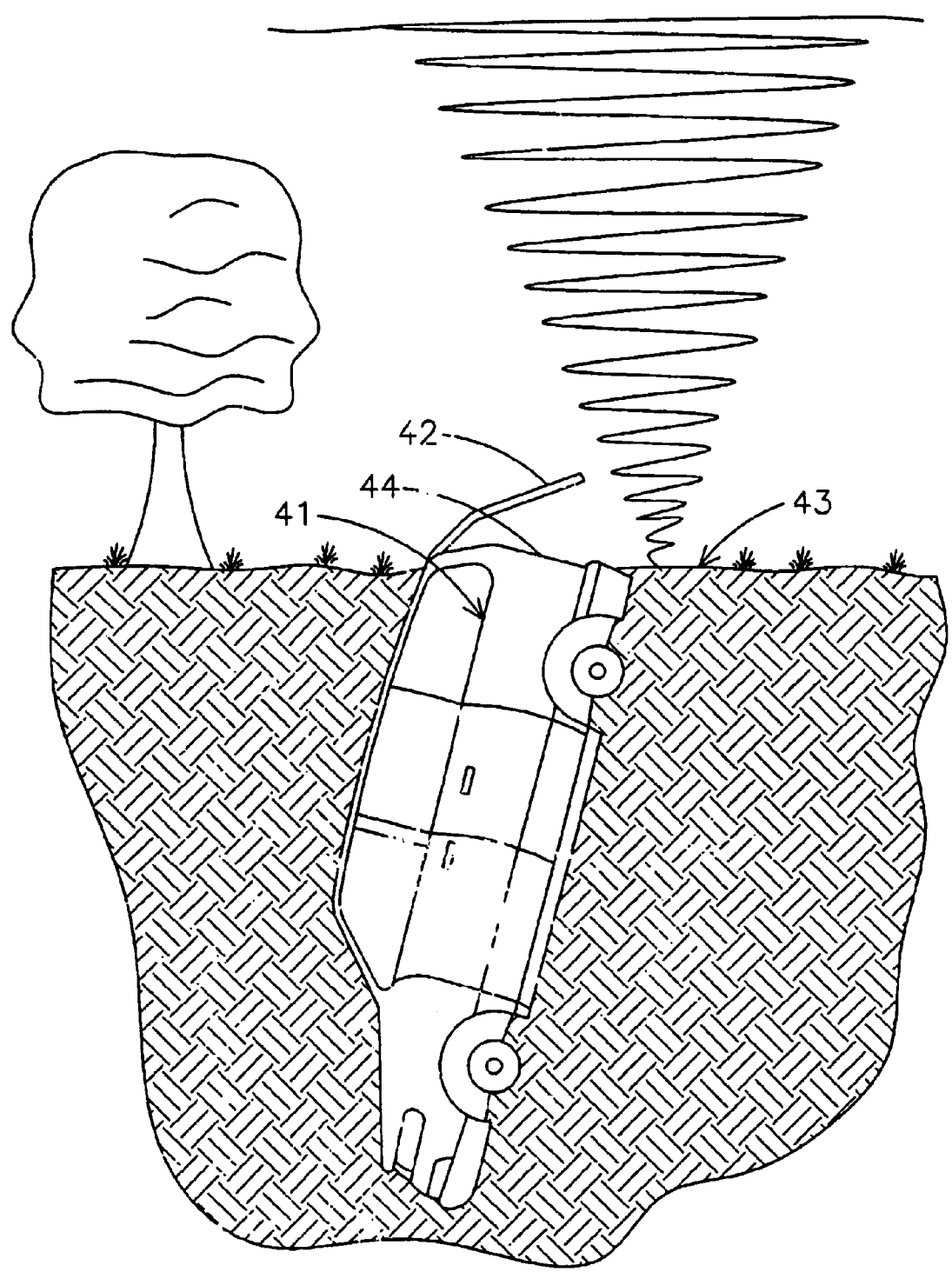
FIG. 8 is a sectional view of a utility structure formed into the earth.

Turning to FIG. 8, a utility structure 40 has utilized a vehicle body 41 having a rear door 42 for use as a tornado shelter or the like accomplished by burying the vehicle body 41 into the earth 43 such that the opening 44 of the rear door 42 is level with the earth's surface 43 so that the door can be raised as shown to allow entrance into the shelter formed with the vehicle body 41.

The process of converting the shelter, as illustrated in the drawings, into a utility structure includes selecting a used vehicle which typically would be at the end of the vehicle's useful life, and removing operative components, such as engine, transmission, and vehicle seats. The selected vehicle has at least one entrance door and a plurality of wheels with each wheel being mounted to a plurality of vehicle wheel studs. A support stand is next selected for attachment to each end of each axle to replace one wheel and is mounted to the wheel studs for supporting the vehicle on a surface. Each wheel is replaced with a support stand for supporting the vehicle on a surface and is attached thereto with one or more lug nuts. The other steps in the process may include removing the engine from the vehicle and removing the fuel tank and removing the transmission. The process may also include the placing of the vehicle wheels into the vehicle body, such as in the engine compartment after the engine has been removed or in a trunk of a sedan-type vehicle for later use in moving the utility structure to a different location. The process includes selecting a support stand having a center hub opening and a plurality of stud openings therein and having a flat base portion for supporting an upright post. The process may also include the step of attaching shelves to the interior of the vehicle body or attaching cots to the interior and to the adding of an electric power source, such as a solar battery, to operate lights or other electrical components for the utility shed.

Figure 9:
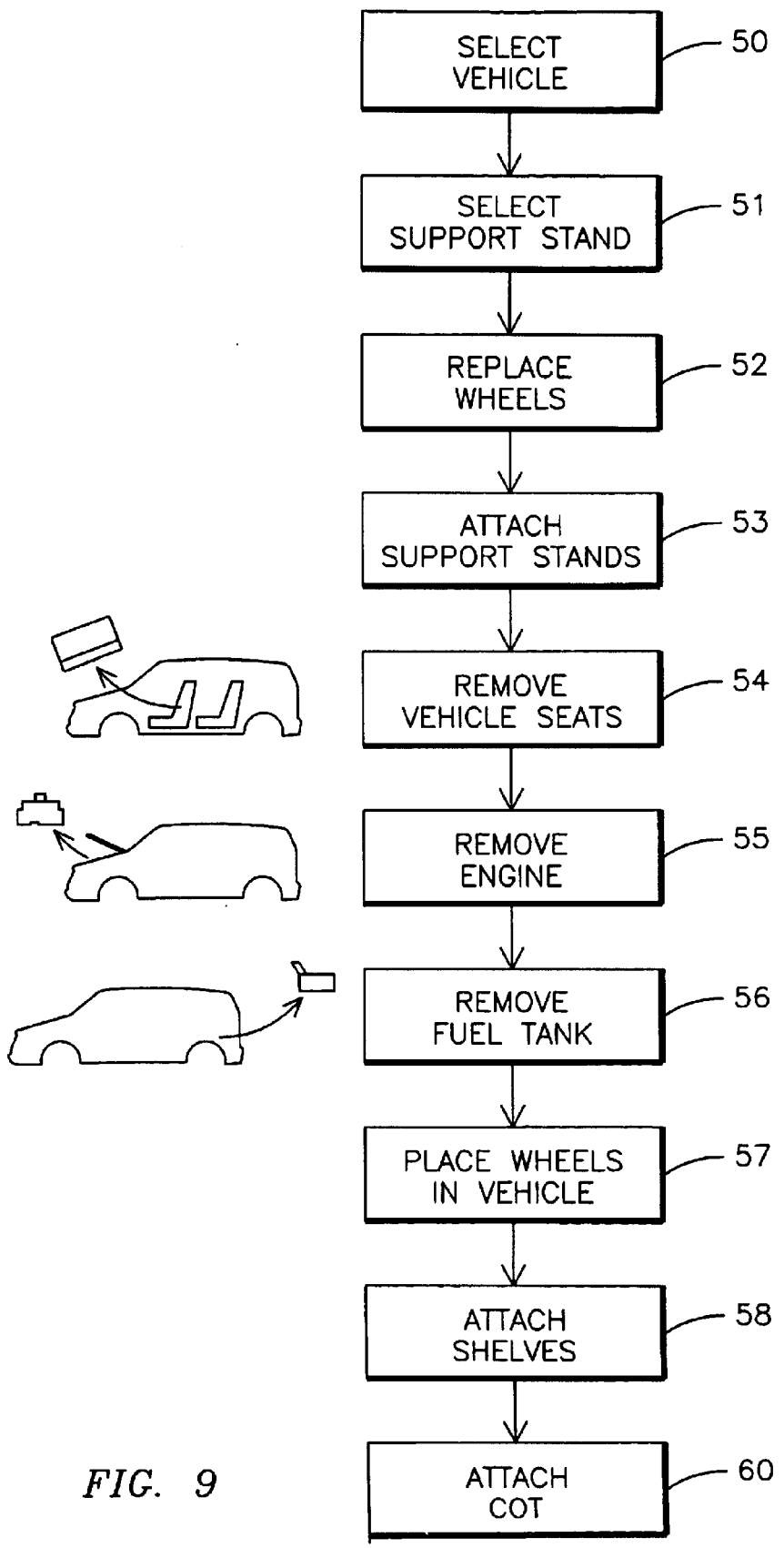
FIG. 9 is a flow diagram of the process of the present invention.

FIG. 9 illustrates the overall claimed process with a flow diagram in which the vehicle is selected 50 which is a used vehicle having a vehicle body with at least one seat and an engine therein and having at least one entrance door and a plurality of wheels with each wheel mounted to a plurality of vehicle wheel studs. A support stand is selected (51) for attachment to at least one of the wheel studs of the selected vehicle for supporting the vehicle on a surface and the wheels are replaced (52) with the support stands. One or all of the vehicle seats are removed (54) and the engine is removed (55) from the vehicle. The fuel tank is removed (56) from the vehicle and the wheels are placed (57) in the vehicle in the engine compartment where the engine has been removed at 54. Shelves are attached (58) in the vehicle and a cot may be attached (60). The process flow diagram of FIG. 9 shows the process of converting a vehicle into a utility structure in which the steps set for in the specification and claims are illustrated in a flow diagram with diagrammatic views of the removal of the seats, engine and fuel tanks.

It should be clear at this time that a process of converting a vehicle into a utility structure has been provided. However, the present invention should not be construed as limited to the forms shown which are to be considered illustrative rather than restrictive.

What is claimed is:

1. A process of converting a vehicle into a utility structure comprising the steps of:
   selecting a used vehicle having a vehicle body having at least one seat and an engine therein, and having at least one entrance door and a plurality of wheels, each said wheel mounted to a plurality of vehicle wheel studs;
   removing said engine from said used vehicle;
   selecting a support stand for attachment to at least one said wheel stud of said selected vehicle for supporting said vehicle on a surface;
   replacing at least one of said plurality of wheels with one said support stand;
   placing said at least one replaced wheel into said vehicle body engine compartment;
   attaching at least one said support stand to at least one said vehicle wheel stud; and
   removing at least one seat from said used vehicle;
   whereby a used vehicle is converted to a utility structure.

2. The process of converting a vehicle into a utility structure in accordance with claim 1 including the step of removing a fuel tank from said used vehicle.

3. The process of converting a vehicle into a utility structure in accordance with claim 1 including the step of placing said replaced vehicle wheels into said vehicle body, whereby said wheels can be replaced onto said used vehicle for movement of said vehicle.

4. The process of converting a vehicle into a utility structure in accordance with claim 1 in which the step of selecting a wheel stand includes selecting a wheel stand having a center hub opening and a plurality of wheel stud openings therein.

5. The process of converting a vehicle into a utility structure in accordance with claim 1 in which the step of selecting a wheel bracket includes selecting a wheel stand having a flat base portion attached to an elongated support post for supporting said stand and vehicle on a generally flat surface.

6. The process of converting a vehicle into a utility structure in accordance with claim 1 including the step of attaching shelves to the interior of said used vehicle.

7. The process of converting a vehicle into a utility structure in accordance with claim 1 including the step of attaching cots to the interior of said used vehicle.

8. The process of converting a vehicle into a utility structure in accordance with claim 1 in which the selected used vehicle is an automobile.

9. The process of converting a vehicle into a utility structure in accordance with claim 1 in which the selected used vehicle is a van.

* * * * *